Dec. 10, 1963    F. B. ANDERSON    3,114,117
TUNABLE RC OSCILLATOR
Filed May 20, 1960    4 Sheets-Sheet 1

INVENTOR
F. B. ANDERSON
BY
ATTORNEY

Dec. 10, 1963     F. B. ANDERSON     3,114,117
TUNABLE RC OSCILLATOR

Filed May 20, 1960     4 Sheets-Sheet 4

INVENTOR
F. B. ANDERSON
BY
ATTORNEY

3,114,117
TUNABLE RC OSCILLATOR
Frithiof B. Anderson, Winston-Salem, N.C., assignor to Bell Telephone Laboratories, Incorporated, New York, N.Y., a corporation of New York
Filed May 20, 1960, Ser. No. 30,550
4 Claims. (Cl. 331—141)

This invention relates to oscillators and in particular to continuously tunable oscillators.

A continuously tunable oscillator configuration frequently used because of its simplicity and reliablity includes a frequency selective feedback path comprising a series arm and a shunt arm. Wide tuning range oscillators having this configuration are disclosed, for example, in the second FIG. 5 of Hewlett-Packard Journal, vol. 8, No. 5, dated January 1957 and in an article entitled, "Modified Wien Bridge Extends Oscillator Tuning Range" in the August 1959 issue of Electrical Design News. As far as applicant is aware, prior art oscillators having this configuration have at least one variable component in their series arms and at least one variable component in their shunt arms for tuning purposes. Because these variable components are located in both the series and the shunt arms, a tuning problem is sometimes encountered. In particular, it is not always possible or feasible to connect them to a point of alternating current ground potential so as to substantially eliminate the possibility of parasitic capacitances which often cause oscillation frequencies other than those desired when tuning.

An object of the present invention is to reduce, in continuously tunable oscillators, parasitic capacitances which often cause oscillation frequencies other than those selected.

In one of its broader aspects, the present invention takes the form of an oscillator having a feedback path comprising a series arm having a logarithm of admittance versus logarithm of frequency (hereinafter referred to as log $Y$ vs. log $f$) characteristic that has a substantially constant slope over the tuning range of the oscillator and a shunt arm having a log $Y$ vs. log $f$ characteristic that has at least two asymptotic slopes, one slope being greater than and the other slope being less than that of the series arm. The series arm is nonadjustable so that its characteristic remains constant while the shunt arm is adjustable so that the frequency at which its asymptotic slopes meet may be changed. In accordance with the invention the feedback path provides, for all settings of the shunt arm, a substantially constant phase shift and a maximum ratio of output to input signals at approximately the frequency where the asymptotic slopes of the shunt arm meet. The remainder of the oscillator provides, in a conventional manner, the additional gain and substantially fixed phase shift necessary for oscillation to always occur at substantially the frequency where the shunt arm asymptotic slopes meet.

A feature of the present invention which both particularly distinguishes it from the previously mentioned oscillators and reduces parasitic capacitances is the relationship between the arms of the feedback path. To applicant's knowledge, the operation of prior art oscillators of this general configuration depends upon the series arm having an asymptotic slope of zero when the shunt arm has an asymptotic slope greater than zero but not greater than one and an asymptotic slope greater than zero but not greater than one when the shunt arm has an asympotic slope of zero. In accordance with the present invention, the series arm comprises fixed components and has, over the tuning range of the oscillator, a substantially constant slope that is less than the greater asymptotic slope of the shunt arm but greater than the lesser asymptotic slope of the shunt arm. This feature of the invention restricts all of the variable components in the feedback path to the shunt arm, which permits parasitic capacitances frequently present in tuning an oscillator to be reduced to a minimum by returning the shunt arm to the alternating current ground.

In one embodiment of the invention, the series arm is a parallel circuit in which each branch of the circuit comprises a fixed resistor and a fixed capacitor connected in series. The values of these resistors and capacitors are chosen so that the parallel circuit has a log $Y$ vs. log $f$ characteristic which has a substantially constant slope greater than zero but less than one over the tuning range of the oscillator. The constancy of the slope is related to the number of branches in the parallel circuit; that is, the greater the number of properly proportioned branches the more constant the slope. Such circuits are well known and are discussed, for example, in the previously identified Hewlett-Packard publication. The shunt arm of this embodiment takes the form of a variable resistor and a variable capacitor which are electrically connected in parallel and mechanically connected in tandem so that the resistance of the resistor and the capacitance of the capacitor may be either increased or decreased together. This shunt arm has a log $Y$ vs. log $f$ characteristic which has an asymptotic slope of zero at the lower frequencies and an asymptotic slope of one at the higher frequencies. The frequency at which these slopes meet may be changed by adjusting the tandem connected resistor and capacitor.

In another embodiment of the invention, the tuning range and the circuit complexity are similar to the oscillators described in the previously mentioned publications while reducing parasitic capacitances. This embodiment is identical to the previously described embodiment of the invention with the exception that the variable resistor in the shunt arm is replaced by a substantially constant slope circuit. This circuit is similar in configuration to the one in the series arm but has variable components which are mechanically connected in tandem so that the slope is substantially the same for all settings of the variable components while the admittance of the circuit changes with the component settings. The slope of this circuit is less than that of the one in the series arm so that the shunt arm has a combined log $Y$ vs. log $f$ characteristic which has two asymptotic slopes within the tuning range, one slope being greater than and the other slope being less than that of the series arm. As in the previously described embodiment, the frequency at which these slopes meet may be changed by adjusting the variable components in the shunt arm, thereby changing the frequency of oscillation of the embodiment.

In accordance with another feature of the invention, the components in the series and shunt arms of the two above-described embodiments may be chosen, in a manner described hereinafter, so that the ratio of output to input signals of the feedback path is substantially constant at the frequency of oscillation for all settings of the shunt arm, thereby making it possible to construct embodiments which require a minimum of amplitude limiting or other gain control.

In still other embodiments of the invention, the circuitry is identical to that of the two previously described embodiments with the exception that only one of the components in the shunt arm is variable. Although these embodiments provide more limited tuning ranges, such embodiments are desirable when a more limited tuning range is acceptable as only one variable component is required.

Other objects and features of the invention will become apparent from a study of the following detailed descriptions of several specific embodiments.

Figure 1A:
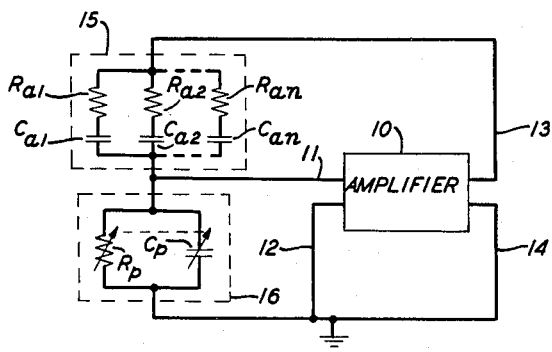
FIGS. 1A, 2A and 3A are schematic diagrams of three embodiments of the invention.

The embodiment illustrated in FIG. 1A includes a conventional amplifier 10 having input leads 11 and 12 and output leads 13 and 14 with leads 12 and 14 connected to a point of ground potential. Amplifier 10 may include a negative feedback path such as those found in Wien bridge oscillators for stabilizing the amplitude and frequency of the oscillator output. Connected between the output and input leads of amplifier 10 is a feedback path comprising a series arm 15 connected between output lead 13 and input lead 11 and a shunt arm 16 connected between input lead 11 and the point of ground potential. Series arm 15 comprises a parallel circuit in which each branch includes a serially connected resistor and capacitor. These resistors are identified as $R_{a1}$, $R_{a2}$, ... $R_{an}$ while the capacitors are identified as $C_{a1}$, $C_{a2}$, ... $C_{an}$. Shunt arm 16 is a parallel circuit comprising a variable capacitor $C_p$ and a variable resistor $R_p$ which are electrically connected in parallel and mechanically connected in tandem so that the resistance of resistor $R_p$ and the capacity of capacitor $C_p$ may be either increased or decreased together.

Figure 1B:
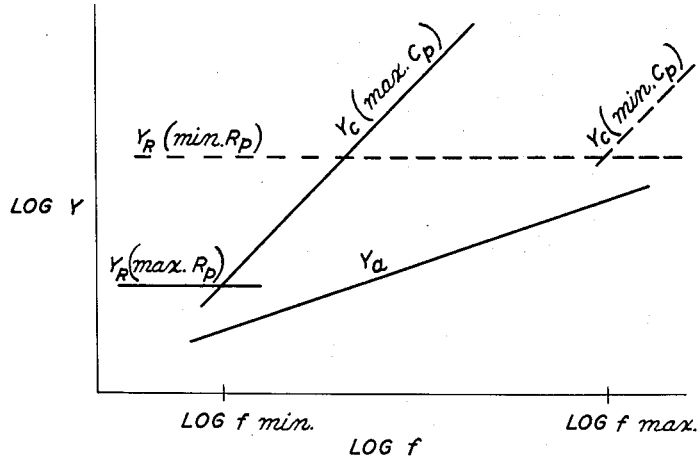
FIGS. 1B, 2B and 3B are diagrams representing the log $Y$ vs. log $f$ characteristics of the series arms and the shunt arms of the embodiments illustrated in FIGS. 1A, 2A and 3A, respectively.

The values of resistors $R_{a1}$ through $R_{an}$ and capacitors $C_{a1}$ through $C_{an}$ in series arm 15 are chosen so that successive branches of the parallel circuit change from a predominantly reactive value to a predominantly resistive value as the frequency of oscillation is increased. In particular, the admittance of this arm is the sum of the admittances of the individual branches. The branches are designed so that, at the lowest frequency of interest, the admittance of one branch exceeds that of all of the others combined. The admittance of this branch increases with frequency and gradually levels off towards an asymptote of zero slope. The admittance of a second branch also increases with frequency and takes over the major contribution to the series arm admittance. In its turn, the admittance of the second branch levels off towards an asymptote of zero slope. This process is repeated for each branch until the required rising admittance characteristic is completed over the frequency band desired. While for simplicity each branch admittance has been asumed to contribute a major portion of the total admittance over a part of the frequency range, it it not always necessary that this contribution exceed that of all of the other branches. The straight line identified as $Y_a$ in FIG. 1B represents the average value of such an admittance line on a log $Y$ vs. log $f$ scale. The extent to which the actual log $Y$ vs. log $f$ characteristic approaches this straight line depends upon the number of branches contained in the parallel circuit of series arm 15. In practice, the deviation may be readily maintained within a few percent. The slope of line $Y_a$, which is between zero and one, is controlled by the admittances of the respective branches of the parallel circuit. The characteristics of such circuits are well known and are described in greater detail, for example, in the previously mentioned Hewlett-Packard Journal.

Also shown in FIG. 1B are the asymptotic lines of the log $Y$ vs. log $f$ characteristics of shunt arm 16 for the maximum and minimum settings of shunt arm 16. In particular, the broken lines identified as $Y_R$ (min. $R_p$) and $Y_C$ (min. $C_p$) are the asymptotic lines for the minimum settings of resistor $R_p$ and capacitor $C_p$ while the solid lines identified as $Y_R$ (max. $R_p$) and $Y_C$ (max. $C_p$) are the asymptotic lines for the maximum settings of resistor $R_p$ and capacitor $C_p$. The slopes of lines $Y_R$ are zero while the slopes of lines $Y_C$ are one.

Figure 1C:
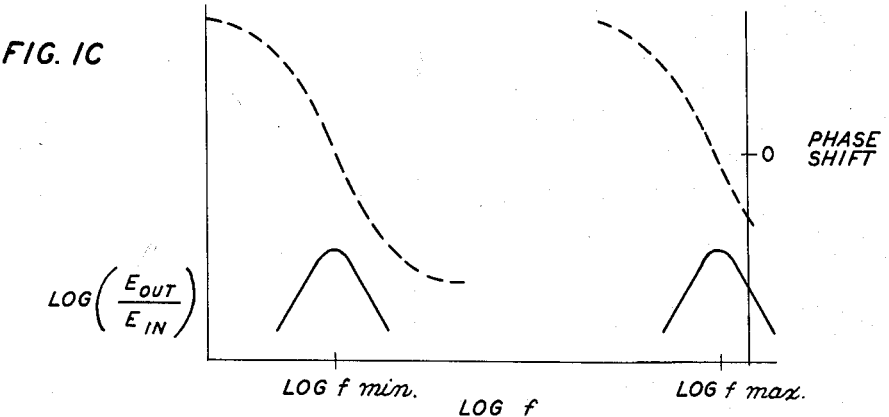
FIG. 1C is a diagram illustrating the gain and phase characteristics of the feedback path in the embodiment of FIG. 1A.

The transmission characteristics of the feedback path of FIG. 1A for the maximum and minimum values of resistor $R_p$ and capacitor $C_p$ are shown in FIG. 1C. The broken lines represent the phase shifts through the feedback path while the solid lines represent the logarithms of the ratios of output signals fed back to input signals for these two settings. For both extremes of the component settings, the phase shifts through the feedback path are substantially equal to zero at the frequencies where the asymptotic lines of shunt arm 16 meet while the logarithms of the amplitude ratios of the output to the input signals are maximum at these same frequencies. The amplifier is assumed to provide a gain substantially flat with substantially no phase shift over the frequency range of oscillation. As a result of these characteristics of the feedback path, the frequency of oscillation of the embodiment of FIG. 1A occurs at substantially the frequency where the asymptotic lines of the shunt arm meet. When the values of resistor $R_p$ and capacitor $C_p$ are each variable over a ten to one range, for example, the tuning range of the embodiment of FIG. 1A is one hundred to one.

FIG. 1C shows the maximum amplitudes of the logarithms of the ratios of output signals fed back to input signals for the maximum and minimum settings of resistor $R_p$ and capacitor $C_p$ to be substantially equal. In accordance with a feature of the invention, a substantially constant feedback signal ratio may be produced for all frequencies of oscillation. This is accomplished by selecting resistor $R_p$ and capacitor $C_p$ so that when they are varied, the point where their asymptotic lines meet describes a straight line which is parallel to the slope of series arm 15. Although the invention may be practiced without taking advantage of this feature, this feature permits the gain characteristics of amplifier 10 to be less stringent.

Figure 2A:
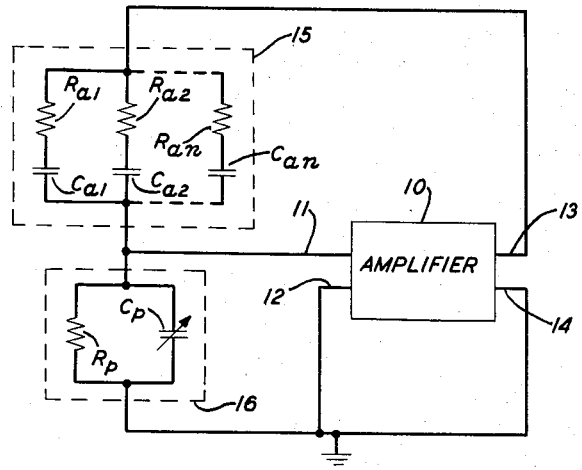
Figure 2B:
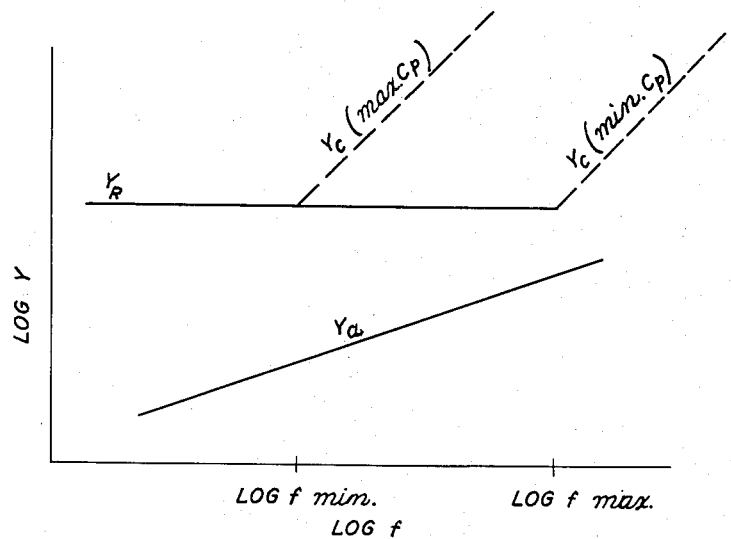

FIG. 2A shows another embodiment of the invention. This embodiment is identical to that of FIG. 1A with the exception that resistor $R_p$ is fixed in value instead of variable. FIG. 2B shows the log $Y$ vs. log $f$ characteristics of series arm 15 and shunt arm 16 of FIG. 2A. The principles of operation of this embodiment are similar to those of the embodiment of FIG. 1A. Furthermore, the invention may be practical by having resistor $R_p$ as the variable component and capacitor $C_p$ as the fixed component. For the same maximum to minimum component variations, the tuning range produced when only one component is variable is less than that produced when resistor $R_p$ and capacitor $C_p$ are both variable. As mentioned previously, when both components are variable over a ten to one range, the tuning range of the oscillator is one hundred to one. When only one of these components is variable over a ten to one range, the tuning range of the oscillator is ten to one. When a more limited tuning range is acceptable, however, the present invention may be practiced by using only one variable component.

Figure 3A:
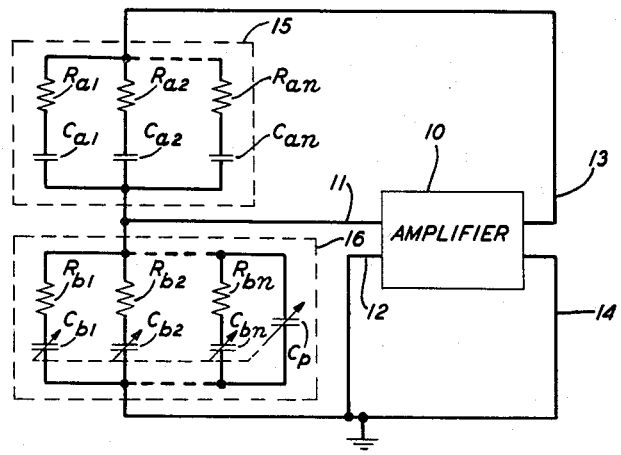

Still another embodiment of the invention is shown in FIG. 3A. This embodiment is identical to that of FIG. 1A with the exception that variable resistor $R_p$ is replaced by a constant slope circuit similar to that forming series arm 15. In particular, the constant slope circuit in shunt arm 16 of FIG. 3A is a parallel circuit in which each arm comprises a fixed resistor and a variable capacitor. The fixed resistors are identified as $R_{b1}$, $R_{b2}$, ... $R_{bn}$ while the variable capacitors are identified as $C_{b1}$, $C_{b2}$, ... $C_{bn}$. Variable capacitors $C_{b1}$ through $C_{bn}$ are mechanically connected to capacitor $C_p$ so that all may be varied simultaneously.

Figure 3B:
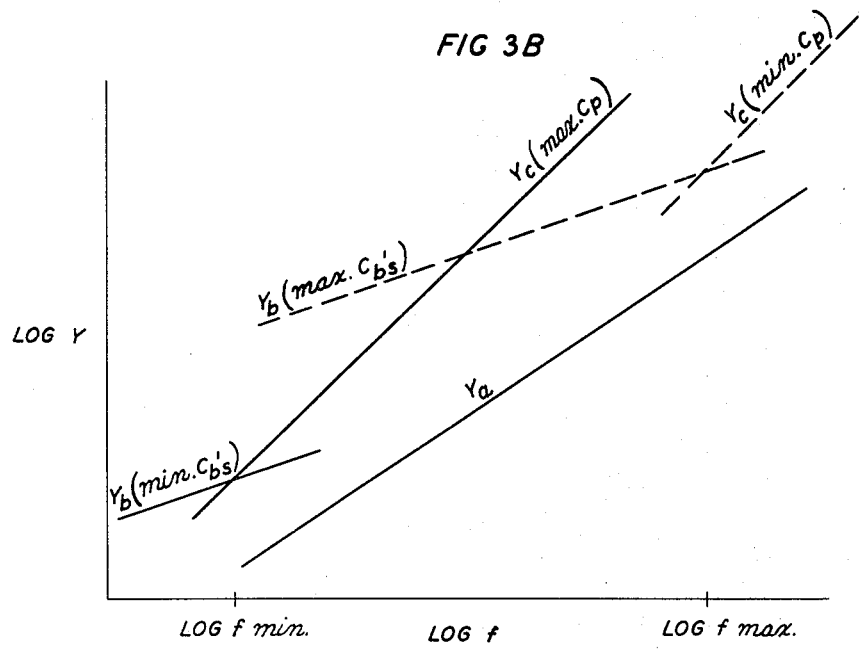

The log $Y$ vs. log $f$ characteristics of arms 15 and 16 of FIG. 3A are illustrated in FIG. 3B. Lines $Y_b$ (maximum $C_b$'s) and $Y_b$ (minimum $C_b$'s) represent the characteristic of the constant slope circuit in arm 16 for the maximum and minimum settings, respectively, of capacitors $C_{b1}$ through $C_{bn}$. The slopes of lines $Y_b$ are greater than zero but less than the slope of line $Y_a$. Because the slope of the constant slope network in arm 16 is greater than zero (which is the slope of the characteristic for resistor $R_p$ in FIG. 1A) a tuning range greater than that obtainable with the embodiment of FIG. 1A is possible when commercially available components only are used in both embodiments. The reason for this will become apparent when FIGS. 1B and 3B are compared with one another. When, for example, $Y_b$ and $Y_c$ each has a maximum to minimum change of ten to one and $Y_b$ has a slope of one-third, a tuning range of one thousand to one is produced. Furthermore, a substantially constant feedback signal ratio may be produced for all frequencies of oscillation in a manner identical to that described with respect to the embodiment of FIG. 1A.

Figure 4A:
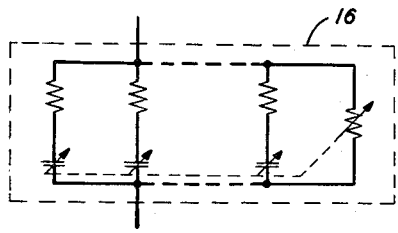
FIGS. 4A, 4B, 4C, 5A and 5B are schematic diagrams of various shunt arms that may be used in practicing the present invention.
Figure 4B:
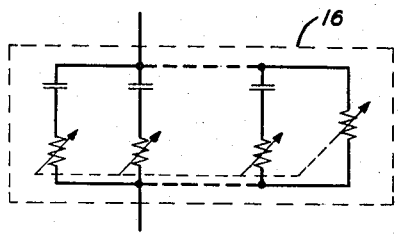
Figure 4C:
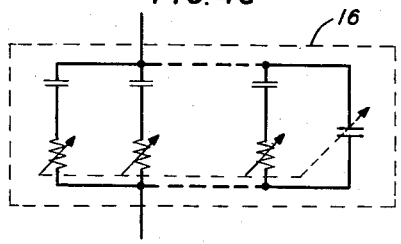

FIGS. 4A, 4B and 4C disclose circuits which may be used in place of the circuit illustrated in shunt arm 16 of FIG. 3A while still maintaining wide tuning ranges. In FIG. 4A, capacitor $C_p$ of FIG. 3A has been replaced by a variable resistor. In FIG. 4B, capacitor $C_p$ of FIG. 3A has been replaced by a variable resistor and the fixed resistors and the variable capacitors of the constant slope circuit in the shunt arm have been replaced by fixed capacitors and variable resistors, respectively. In FIG. 4C, the fixed resistors and variable capacitors of the constant slope circuit in the shunt arm of FIG. 3A have been replaced by fixed capacitors and variable resistors, respectively. It will be noted that all of the variable components in FIGS. 4A, 4B and 4C are connected to the grounded terminal of shunt arm 16, thereby keeping parasitic capacitances at a minimum.

Figure 5A:
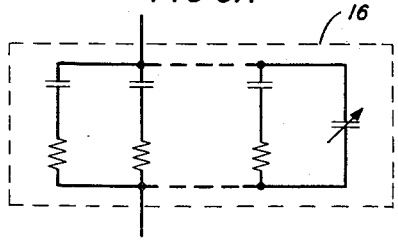
Figure 5B:
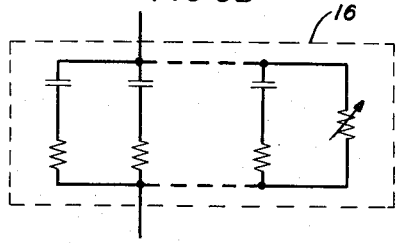

FIGS. 5A and 5B show circuits which may be used in place of the circuit illustrated in shunt arm 16 of FIG. 3A. The circuit of FIG. 5A is identical to that of shunt arm 16 of FIG. 3A with the exception that all of the components in the constant slope circuit are fixed in value. The circuit of FIG. 5B also includes fixed components in a constant slope circuit but instead of having a variable capacitor connected in parallel with the constant slope circuit, it has a variable resistor connected in parallel. When either of the circuits of FIGS. 5A and 5B are used in the embodiment of FIG. 3A, a more limited tuning range is produced for the same maximum to minimum component variations. This tuning range is greater, however, than that obtainable with the embodiment of FIG. 2A when commercially available components only are used in both embodiments.

Figure 6A:
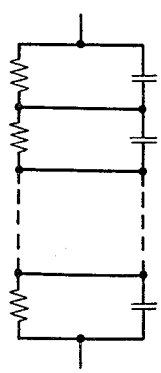
FIGS. 6A, 6B and 6C are schematic diagrams of several constant slope circuits, in addition to those disclosed in the embodiments of FIGS. 1A, 2A and 3A, that may be used in practicing the invention.
Figure 6B:
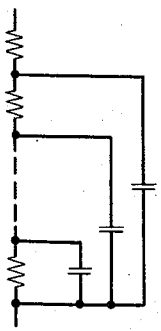
Figure 6C:
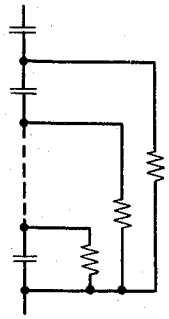

FIGS. 6A, 6B and 6C show several other substantially constant slope circuits which may be used in either the series or shunt arms when practicing the invention. The choice of a circuit to be used in practicing the invention will be determined, among other factors, by the component values required in the various circuits. Furthermore, it should be noted that the circuit shown in FIG. 6A does not lend itself to the grounding of one terminal of each of the resistors or each of the capacitors when it is desired to have a variable constant slope circuit in the shunt arm. The circuit of FIG. 6A may be used, however, in the series arm. Still other constant slope circuits may be used in practicing the invention. Furthermore, inductive components, which have not been used in describing the invention, may be used in the series and shunt arms. When all capacitors are replaced with inductors, asymptotic slopes between 0 and +1 become reversed in sign so that the slopes are between 0 and −1.

Although several embodiments of the invention have been described in detail, it is to be understood that various other embodiments may be devised by those skilled in the art without departing from the spirit and scope of the invention.

What is claimed is:

1. In combination:

that portion of an RC oscillator continuously tunable over a substantial predetermined frequency range which comprises an amplifier having a pair of input terminals and a pair of output terminals and first two-terminal circuit means connected between said amplifier input terminals, said first circuit means including a first plurality of parallel connected resistors and capacitors at least one component of which may be varied in value to vary the frequency of said oscillator over said predetermined frequency range and having a transfer function for each value of the variable component in which the ratio of the logarithm of its admittance to the logarithm of frequency is a first substantially constant ratio over a portion of said predetermined frequency range and a second substantially constant ratio over the remainder of said predetermined frequency range; and second two-terminal circuit means connected between one of said amplifier output terminals and one of said amplifier input terminals, said second circuit means comprising a plurality of networks connected in parallel where each of said networks comprises a fixed-value resistor and a fixed value capacitor connected in series.

2. In combination:

that portion of an RC oscillator continuously tunable over a substantial predetermined frequency range which comprises an amplifier having a pair of input terminals and a pair of output terminals and first two-terminal circuit means connected between said amplifier input terminals, said first circuit means including a first plurality of parallel connected resistors and capacitors at least one component of which may be varied in value to vary the frequency of said oscillator over said predetermined frequency range and having a transfer function for each value of the variable component in which the ratio of the logarithm of its admittance to the logarithm of frequency is a first substantially constant ratio over a portion of said predetermined frequency range and a second substantially constant ratio over the remainder of said predetermined frequency range; and second two-terminal circuit means connected between one of said amplifier output terminals and one of said amplifier input terminals, said second circuit means comprising a plurality of networks connected in series where each of said networks comprises an invariant resistor and an invariant capacitor connected in parallel.

3. In combination.

that portion of an RC oscillator continuously tunable over a substantial predetermined frequency range which comprises an amplifier having a pair of input terminals and a pair of output terminals and first two-terminal circuit means connected between said amplifier input terminals, said first circuit means including a first plurality of parallel connected resistors and capacitors at least one component of which may be varied in value to vary the frequency of said oscillator over said predetermined frequency range and having a transfer function for each value of the variable component in which the ratio of the logarithm of its admittance to the logarithm of frequency is a first substantially constant ratio over a portion of said predetermined frequency range and a second substantially constant ratio over the remainder of said predetermined frequency range; and second two-terminal circuit means connected between one of said amplifier output terminals and one of said amplifier input terminals, said second circuit means comprising a plurality of resistors connected in series and a plurality of capacitors connected between each junction between said resistors and one end of said serially connected resistors, respectively, where said resistors and capacitors have values of resistances and capacitances, respectively, which are substantially fixed over a frequency range substantially equal to said predetermined frequency range.

4. In combination:

that portion of an RC oscillator continuously tunable over a substantial predetermined frequency range which comprises an amplifier having a pair of input terminals and a pair of output terminals and first two-terminal circuit means connected between said amplifier input terminals, said first circuit means including a first plurality of parallel connected resistors and capacitors at least one component of which may be varied in value to vary the frequency of said oscillator over said predetermined frequency range and having a transfer function for each value of the variable component in which the ratio of the logarithm of its admittance to the logarithm of frequency is a first substantially constant ratio over a portion of said predetermined frequency range and a second substantially constant ratio over the remainder of said predetermined frequency range; and second two-terminal circuit means connected between one of said amplifier output terminals and one of said amplifier input terminals, said second circuit means comprising a plurality of capacitors connected in series and a plurality of resistors connected between each junction between said resistors and one end of said serially connected capacitors, respectively, where said resistors and capacitors have values of resistances and capacitances, respectively, which are substantially invariant over a frequency range substantially equal to said predetermined frequency range.

References Cited in the file of this patent

FOREIGN PATENTS

27–5208 Japan _____ Dec. 10, 1952